United States Patent [19]
Arnold

[11] 3,742,765
[45] July 3, 1973

[54] STATIC AND DIFFERENTIAL PRESSURE TRANSDUCERS
[75] Inventor: Mason F. Arnold, Los Angeles, Calif.
[73] Assignee: International Telephone and Telegraph Corporation, New York, N.Y.
[22] Filed: Aug. 22, 1972
[21] Appl. No.: 282,844

[52] U.S. Cl............... 73/398 AR, 73/418, 116/114
[51] Int. Cl............................ G01l 9/04, G01l 7/04
[58] Field of Search.......... 73/85.5 R, 418, 398 AR, 73/411–417; 116/114

[56] References Cited
UNITED STATES PATENTS
3,527,100   9/1970   Talmo et al.................. 73/398 AR Primary Examiner—Donald O. Woodiel
Attorney—C. Cornell Remsen, Jr. et al.

[57] ABSTRACT

Apparatus for accurately producing a D.C. current or voltage directly proportional to the static pressure of a fluid or proportional to the difference between the pressures of the same or different fluids. A mechanical connection is made between a pressure sensor and the free end of a cantilever beam having strain gages fixed thereto. The strain gages are connected in a bridge across which a pressure analog is derived. The mechanical connection includes a strip snap fit over ball bearings mounted on the beam and carrier means fixed to the sensor. The ball bearings double the accuracy of the apparatus achieved with solder connections between the strip, carrier means and beam. The disclosed apparatus also improves the stability of the transmitter output versus time.

5 Claims, 8 Drawing Figures

PATENTED JUL 3 1973   3,742,765

STATIC AND DIFFERENTIAL PRESSURE TRANSDUCERS

BACKGROUND OF THE INVENTION

This invention relates to fluid pressure transducers, and more particularly, to an accuracy improving sensor-to-cantilever beam connection in a static or differential pressure transducer.

In the past, it has been the practice to fix strain gages to a cantilever beam and then deflect the beam in accordance with static or differential pressures. See. U.S. Pat. Nos. 3,518,886 and 3,532,869. It has also been the practice to provide a soldered wire connection between the end of a Bourdon tube and the free end of such a beam. See U.S. Pat. No. 3,527,100.

Although the above-mentioned patents provide good solutions to the problem of obtaining a pressure analog, increased accuracy and better stability are always desirable.

SUMARY OF THE INVENTION

In accordance with the device of the present invention, pivots for the pressure sensor-beam connection are provided. These pivots double the accuracy of the instrument.

The above-described and other advantages of the present invention will be better understood from the following detailed description when considered in connection with the accompanying drawings.

BRIEF DESCRIPTION OF THE DRAWINGS

In the drawings which are to be regarded as merely illustrative.

DESCRIPTION OF THE PREFERRED EMBODIMENTS

Figure 1:
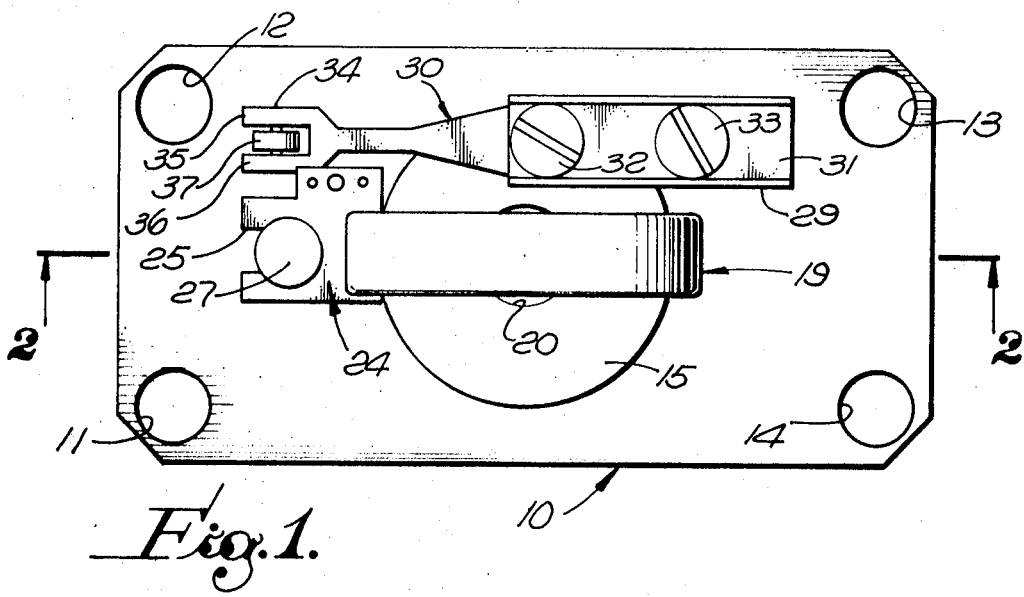
FIG. 1 is a top plan view of a portion of the apparatus of the present invention.

In the drawing, in FIG. 1, a mounting plate 10 is shown having bolt holes 11, 12, 13 and 14. Plate 10 may, thus, be bolted to a tank containing fluid under pressure.

Figure 2:
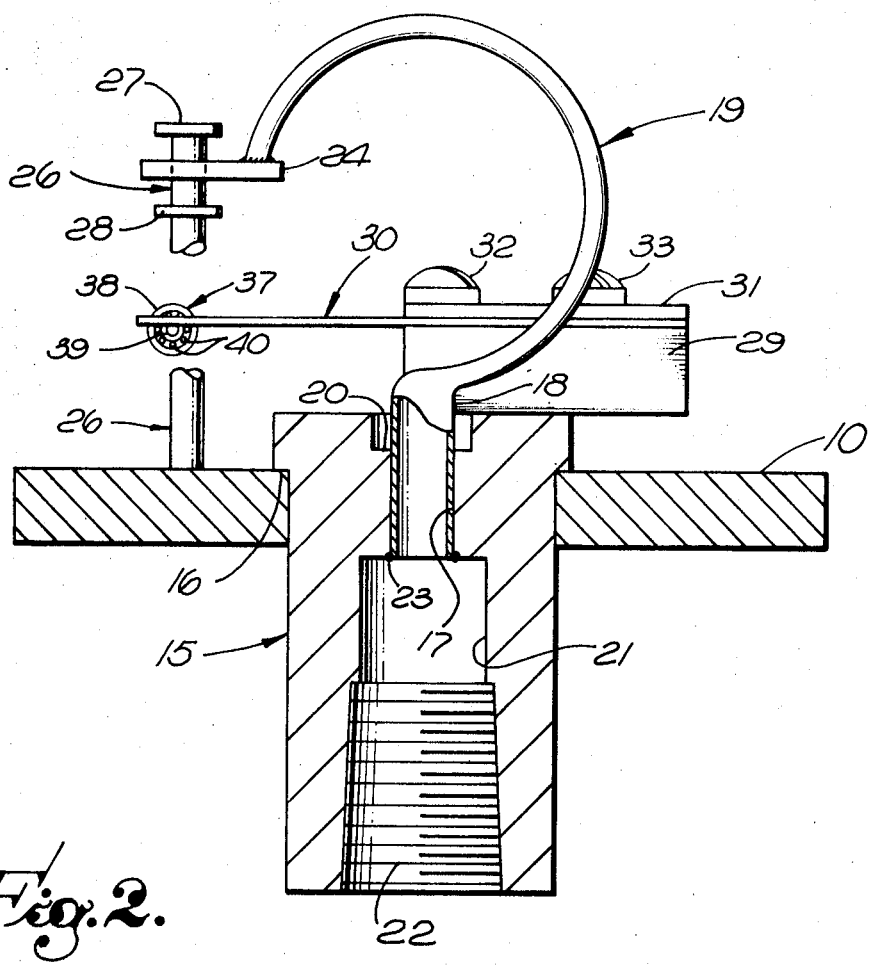
FIG. 2 is a vertical sectional view taken on the line 2—2 through the apparatus shown in FIG. 1.

A cylinder 15 is sealed through plate 10, as shown in FIG. 2. Cylinder 15 has a shoulder 16 which abuts the upper surface of plate 10, as viewed in FIG. 2. Cylinder 15 has a bore 17 through which a shank portion 18 of a Bourdon tube 19 is positioned. Cylinder 15 has a counter bore 20 at its upper end, and a counter bore 21 at its lower end, counter bore 21 being threaded at 22, if desired.

Shank 18 of Bourdon tube 19, at its extreme lower and outer edge, is heliarc welded at 23 to cylinder 15.

A plate 24 is fixed to the free end of Bourdon tube 19. Plate 24 supports other apparatus to be described, but not shown in FIGS. 1 and 2. Plate 24 has a slot 25 therein which loosely straddles a post 26 shown in FIG. 2. Post 26 has flanges at 27 and 28 to act as stops. Vertical movement of plate 24 is, thus, limited by the flanges 27 and 28.

As shown in FIG. 2, a block 29 is fixed relative to cylinder 15. A leaf spring cantilever beam 30 is clamped to block 29 by a plate 31 and screws 32 and 33.

As shown in FIG. 1, a shaft 34 is spot welded to projections 35 and 36 of beam 30. Shaft 34 has a ball bearing 37 rotatable thereon. Ball bearing 37 is press fit on shaft 34 before it is spot welded to projections 35 and 36.

As shown in FIG. 2, post 26 is fixed to plate 10. Ball bearing 37 has an outer race 38, an inner race 39 and balls 40.

Figure 3:
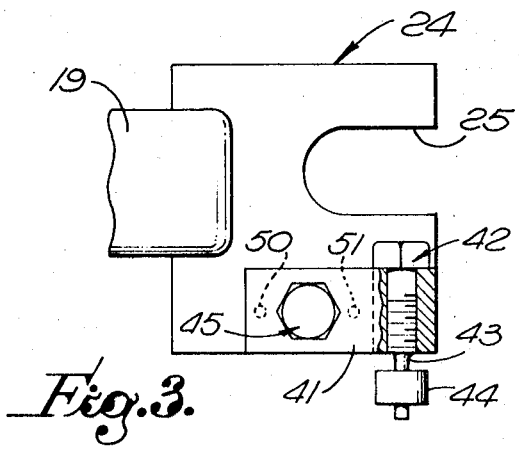
FIG. 3 is an enlarged top plan view, partly in section, of the apparatus shown in FIG. 1.
Figure 5:
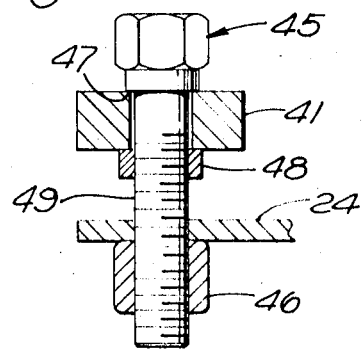
FIG. 5 is an enlarged vertical sectional view, partly in elevation, taken on the line 5—5 through the apparatus shown in FIG. 4.
Figure 4:
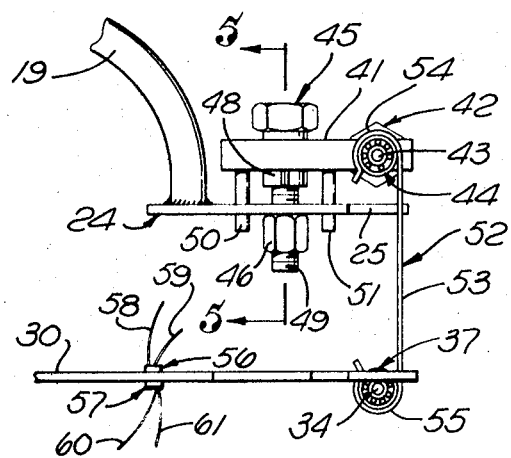
FIG. 4 is a side elevational view of the structure shown in FIG. 3.

As shown in FIGS. 3, 4 and 5, plate 24 carries another plate 41 that has a bolt 42 threaded therethrough. Bolt 42 has a shaft portion 43 onto which a ball bearing 44 is press fit. Ball bearing 44 may be identical to ball bearing 37, if desired. Plate 41 is vertically adjustable, as viewed in FIG. 4.

As shown in FIG. 5, a bolt 45 is threaded through plate 24 and has a lock nut 46 threaded thereon. Bolt 45 has a shoulder 47 that abuts the upper surface of plate 41. A ring 48 is fixed to a portion of the threaded shank 49 of bolt 45 by crimping. Plate 41 has two guide pins 50 and 51 which are fixed to plate 41 and are slidable through holes slightly larger than the pins in plate 24.

As shown in FIG. 4, a link 52 connects the bearings 37 and 44. Link 52 has a straight portion 53, and hook-shaped end portions 54 and 55 which extend around and engage the outer races of bearings 44 and 37, respectively. If desired, link 52 may be a strip of relatively stiff metal uniform in thickness and width throughout its length. The width of link 52 may, if desired, be equal to the width of the outer races of the bearings 37 and 44.

If desired, end portions 54 and 55 of link 52 may be identical in size and shape when assembled as shown in FIG. 4, and when disassembled therefrom.

Figure 6:
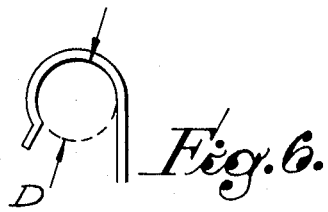
FIG. 6 is a broken away side elevational view of a connection link employed with the present invention.

When disassembled, the end portions 54 and 55 of link 52 will be unstressed. Thus, the unstressed diameter, D, of the end portions 54 and 55, as shown in FIG. 6, may be less than the outside diameter of the outer races of the bearings 37 and 44. This means that end portions 54 and 55 of the link 52 may be snap fit over the outer races of the bearings 44 and 37, respectively, and will stay securely mounted thereon by frictional engagement therewith. Preferably, when in use, nut 46 is loosened and bolt 45 is turned to adjust the position of plate 41 so that straight portion 53 of link 52 is always placed in tension over the range of the instrument. Bolt 45 is locked in such a position by tightening lock nut 46.

In FIG. 4, note will be taken that conventional silicon strain gages are fixed to opposite sides of beam 30 at 56 and 57. Strain gage 56 has electrical leads 58 and 59. Strain gage 57 has electrical leads 60 and 61.

Figure 7:
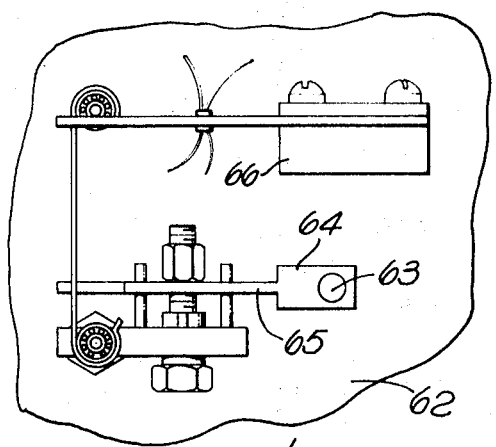
FIG. 7 is a side elevational view of an alternative embodiment of the present invention.

An alternative embodiment of the invention is shown in FIG. 7. The embodiment shown in FIG. 7 is more or less another application of the embodiment illustrated in FIGS. 1–6, inclusive. All the structure in FIG. 7 may be identical to the structure described in FIGS. 1–6 with the exception of a backplate 62 of a conventional differential pressure unit, a torque tube output shaft 63 therefrom and a member 64 fixed to shaft 63 and integral with a plate 65 identical to plate 24. In the embodiment of FIG. 7, a block 66 identical to block 29 is fixed to backplate 62.

Figure 8:
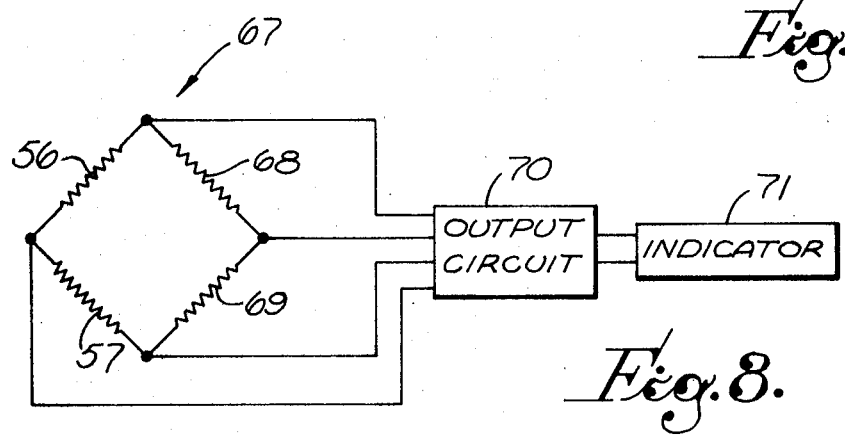
FIG. 8 is a block diagram of the circuit of the present invention.

The embodiments of FIGS. 1-7 may be employed with the circuit of FIG. 8. For example, strain gages 56 and 57 may be connected in a Wheatstone bridge 67 which has resistors 68 and 69. The bridge 67 may then be connected to an output circuit 70 having an indicator 71 connected therefrom. Indicator 71 may be a voltmeter calibrated in units of pressure, if desired. However, indicator 71 may be any utilization means.

Output circuit 70 may be of the type disclosed in U.S. Pat. No. 3,518,886, if desired. Utilization means is connected across a resistor in the case because the pressure or differential pressure output of this circuit is directly proportional to the D.C. output current of the output circuit, the load resistor being connected in series in the output circuit and having the said D.C. current passed therethrough. However, it is possible to use the current analog without converting it to a voltage analog.

The circuit of U.S. Pat. No. 3,532,869 may also be employed with the present invention.

The phrase "utilization means" is hereby defined to include a pressure indicator or any means for utilizing the output of circuit 70. Thus, the phrase "utilization means" can mean an open end or closed end control system including, but not limited to, a pressure control system or a process control system.

What is claimed is:

1. Apparatus for producing an accurate analog output signal directly proportional to fluid pressure, said apparatus comprising: a base; a leaf spring cantilever beam having one end fixed relative to said base; pressure sensing means mounted on said base; carrier means mounted on said pressure sensing means in a position to move in a first predetermined direction an amount proportional to a change in said pressure, said carrier means including a first shaft extending in a second predetermined direction approximately perpendicular to said first direction, said beam, when unstressed, extending approximately in a plane normal to said first direction; a second shaft mounted on said beam in a position approximately parallel to said first shaft and approximately perpendicular to the length of said beam; first and second bearings rotatable on said first and second shafts, respectively; a connecting member having first and second end portions fastened to said first and second bearings, respectively; strain gage means fixed relative to said beam in a position between said beam fixed end and said second shaft; electrical means connected from said strain gage means to produce an output signal directly proportional to the deflection of said beam; and utilization means connected from said electrical means.

2. The invention as defined in claim 1, wherein said member end portions hook around said respective bearings, said member including a strip, each of said bearings being a ball bearing, said bearings having corresponding component parts of substantially the same size and shape, each of said bearings including inner and outer races separated by a set of balls, each outer race having an external cylindrical surface of a uniform width around its circumference, said strip having a width approximately equal to that of said outer races and being mounted in a position covering substantially all of predetermined arcuate portions of said outer races, said strip having a straight portion connecting said bearings, said strip having a shape substantially defined by the movement of a line segment perpendicular to its length with the center thereof tracing a plane curve, said strip end portions, when unstressed, substantially forming an arc of a circle having a diameter slightly less than that of said outer race external surfaces to snap fit thereon, each of said strip end portions extending over an arc greater than 180 degrees, said strip straight portion extending approximately normal to said beam, said pressure sensing means being adapted to rotate said carrier means approximately about a predetermined axis spaced from said first shaft in the same direction that said beam fixed end is spaced from said second shaft, said beam being flat and, when unstressed, lying in a first plane, a second plane through the axis of said first shaft and through said predetermined axis lying parallel to said first plane, said utilization means being a voltmeter calibrated in units of pressure, said strip straight portion being located on the sides of said shafts opposite the side on which said beam fixed end is located.

3. The invention as defined in claim 1, wherein said utilization means includes a voltmeter calibrated in units of pressure.

4. The invention as defined in claim 3, wherein said member includes a strip.

5. The invention as defined in claim 1, wherein said member includes a strip.

* * * * *